Aug. 11, 1931.  F. J. FISCHER  1,818,701

RECTIFIER

Filed Jan. 18, 1929

Inventor:
Franz Joseph Fischer
by *Kluwinausis*
Atty.

Patented Aug. 11, 1931

1,818,701

UNITED STATES PATENT OFFICE

FRANZ JOSEPH FISCHER, OF DRESDEN, GERMANY, ASSIGNOR TO THE FIRM KOCH & STERZEL AKTIENGESELLSCHAFT, OF DRESDEN, GERMANY

RECTIFIER

Application filed January 18, 1929, Serial No. 333,287, and in Germany January 21, 1928.

My invention relates to rectifiers, more especially of the synchronously rotating type. It has been suggested to connect the source of polyphase voltage to the rotary contacts of the rectifier and to connect the poles of the voltage supply during the time in which they are cut off from the twin circuit, to the neutral point of the source of voltage by means of auxiliary resistances, the magnitude of which is of the order of the impedance of the load circuit. In such arrangements compensating currents are produced when the rotary contacts leave one of the poles and reach another pole. It is an object of my invention to damp the compensating currents, so as to obtain steady operation of the rectifier. To this end I provide a single system of rotary contacts with two sets of staggered segments, one set serving for receiving the direct current, while the segments in the other set are connected with each other across auxiliary resistances.

In polyphase current rectifiers of the kind described for high or low voltage it has already been proposed to connect the secondary polyphase voltage to the rotary contacts and to connect the poles of the polyphase current generator which are temporarily disconnected from the twin-conductor circuit, to the central or neutral phase points of the multiphase current generator across a resistance which is selected in proportion to the apparent load resistance. In this arrangement, however, the above-mentioned compensating currents are not damped in such manner as to obtain steady operation of the rectifier. Besides rectifiers of this type involve the drawback that the rotary contacts are arranged on the shaft of the rectifier in several sets side by side, thus increasing the length of the machine and requiring bearings of particular design.

This drawback is eliminated according to this invention by providing a single system of rotary contacts and two sets of staggered stationary segments one of which serves for taking the direct current, while the segments of the other row are interconnected across auxiliary resistances. The length of the machine and the initial cost of the plant are thus greatly reduced and so are the compensating currents between the end of one and the beginning of the subsequent phase. This is due to the auxiliary resistances and cannot be obtained to a sufficient extent by providing a single resistance. To provide such a connection in rectifiers as hitherto designed would involve a very complicated system of connections as additional contact pieces with a corresponding number of brushes would have been required.

Another advantage may be obtained by connecting in a well known manner the common connecting point of the auxiliary resistances with the neutral point of the source of alternating current, whereby the excess voltages in the disconnected phases are damped. A particularly advantageous connection is provided by inserting only a single auxiliary resistance between each segment and the zero point of the source of alternating current.

In the drawings affixed to this specification and forming a part thereof a rectifier embodying my invention and its diagram of connections are illustrated diagrammatically by way of example.

In the drawings

Fig. 1 is a perspective illustration of the rectifier, while

Figure 1:
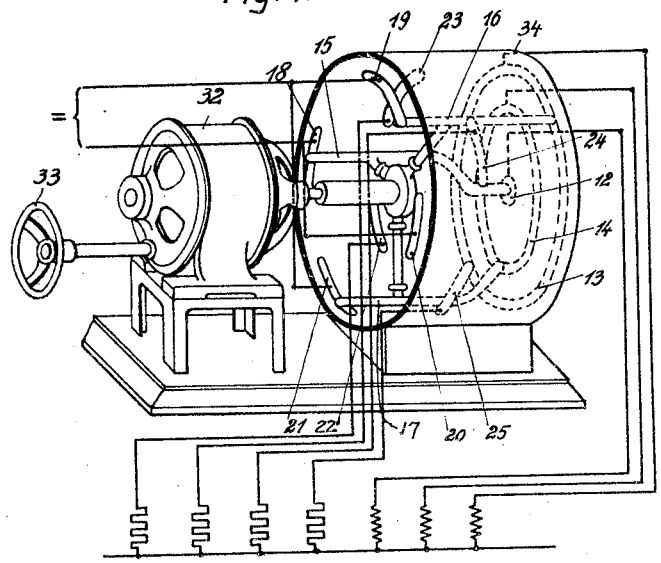

Referring to the drawings and first to Fig. 1, 32 is a synchronous motor, the stator of which is adapted to be adjusted by a handwheel 33 as is known in this art. 15, 16, and 17 are rotary contacts on the shaft of the motor 32 which are pitched at 120 degs., their ends being connected with slip rings 12, 13, and 14, which are secured to the end wall of an insulating cylinder 34 in which the contacts 15, 16, 17 are rotating. 18—25 are two rows (a and b) of segments arranged on the inner wall of the cylinder 34 in staggered relation and which are alternately connected with each other by the rotary contacts.

Figure 2:
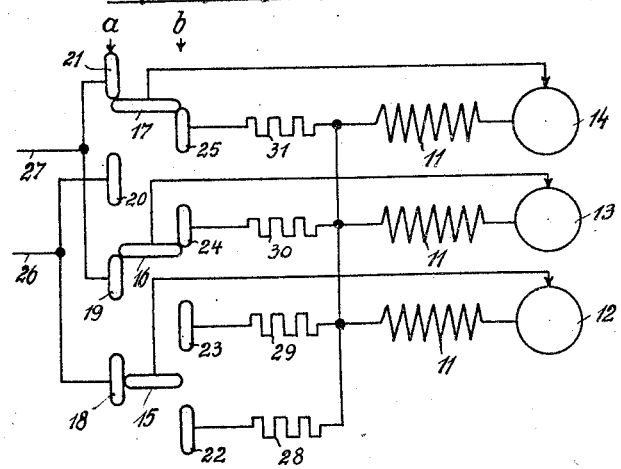
Fig. 2 is a diagram of connections.

The segments 18—21 serve for receiving the direct current by means of conductors 26, 27, while the segments 22—25 are connected with each other across the auxiliary resistances 28, 29, 30, and 31, and connected with the zero point of the transformer 11 shown in Fig. 2, the secondary polyphase voltage of which is led to the rotary contacts 15, 16, 17 across slip rings 12, 13, and 14.

The operation of the rectifier is as follows: The rotary contacts 15, 16, 17, being in the position shown in Figs. 1 and 2, the slip ring 12 and the pole of the transformer connected to it are connected to the contact segment 18 and to the direct current line 26. The transformer pole connected to the slip ring 13 has been connected a moment before to the contact segment 19 and to the direct current line 27. In the position shown in the drawings the rotary contact 16 is leaving the contacting segment 19 and making contact with the segment 24. In consequence thereof the transformer winding connected to the slip ring 13 is short-circuited over the resistance 30 so that the compensating current produced by the interruption of the contact between the rotary contact 16 and the contacting segment 19 is damped by the resistance 30. The transformer winding connected to the slip ring 14 has been short-circuited a moment before by the resistance 31. In the position shown in the drawings the rotary contact 17 is leaving the contacting segment 25 connected to the resistance 31 and making contact with the contacting segment 21, thereby connecting the slip ring 14 to the direct current line 27. The contacting segments are arranged in such manner that each of the rotary contacts 15, 16, 17 is always in contact with at least one of the contacting segments so that each slip ring and the transformer winding connected thereto are connected either to the direct current line or to one of the damping resistances 28—31. In consequence thereof compensating currents of undesirable intensity are not produced in the transformer windings and sparking of the rectifying device is prevented.

I wish it to be understood that I do not desire to be limited to the exact details of construction shown and described for obvious modifications will occur to a person skilled in the art.

I claim:—

1. Rectifying device comprising a plurality of slip rings, a source of polyphase voltage connected to said slip rings, contacting segments arranged in two rows in staggered relation, resistances connected to one row of said contacting segments and to said source of voltage, connections connecting each contacting segment of the second row with the next but one segment, direct current terminals connected to said second row of contacting segments, and a rotary contact in contact with each slip ring and adapted to slide successively along said contacting segments.

2. Rectifying device comprising a plurality of slip rings, a source of polyphase voltage having a zero point and connected to said slip rings, contacting segments arranged in two rows in staggered relation, star-connected resistances connected to one row of said contacting segments and to the zero point of said source of voltage, connections connecting each contacting segment of the second row with the next but one segment, direct current terminals connected to said second row of contacting segments, and a rotary contact in contact with each slip ring and adapted to slide sucessively along said contacting segments.

3. Rectifying device comprising a plurality of slip rings, a source of polyphase voltage having a zero point and connected to said slip rings, contacting segments arranged in two rows in staggered relation, star-connected resistances connected to one row of said contacting segments and to the zero point of said source of voltage so that only a single resistance is inserted between each segment and the zero point of said source of voltage, connections connecting each contacting segment of the second row with the next but one segment, direct current terminals connected to said second row of contacting segments, and a rotary contact in contact with each slip ring and adapted to slide successively along said contacting segments.

4. Rectifying device comprising an insulating cylinder, an end wall in said cylinder, a plurality of slip rings supported by said end wall, a source of polyphase voltage connected to said slip rings, an inner wall in said cylinder, contacting segments arranged on said inner wall in two rows in staggered relation, resistances connected to one row of contacting segments and to said source of voltage, connections connecting each contacting segment of the second row with the next but one segment, direct current terminals connected to said second row of contacting segments, and a rotary contact in contact with each slip ring and adapted to slide successively along said contacting segments, said rotary contacts being arranged within said cylinder.

5. Rectifying device comprising a rotatably supported insulating cylinder, an end wall in said cylinder, a plurality of slip rings supported by said end wall, a source of polyphase voltage connected to said slip rings, an inner wall in said cylinder, contacting segments arranged on said inner wall in two rows in staggered relation, resistances connected to one row of said contacting segments and to said source of voltage, connections connecting each contacting segment of the second row with the next but one segment, direct current terminals connected to said second row of contacting segments, and a rotary contact in contact with each slip ring, and adapted to slide successively along said contacting segments, said rotary contacts being arranged within said cylinder.

In testimony whereof I affix my signature.

FRANZ JOSEPH FISCHER.